US009268096B1

(12) United States Patent
Krasulick et al.

(10) Patent No.: US 9,268,096 B1
(45) Date of Patent: Feb. 23, 2016

(54) METHOD AND SYSTEM FOR OPTICALLY COUPLING A WAVEGUIDE AND A FIBER

(71) Applicant: Skorpios Technologies, Inc., Albuquerque, NM (US)

(72) Inventors: Stephen B. Krasulick, Albuquerque, NM (US); Timothy Creazzo, Albuquerque, NM (US); Elton Marchena, Albuquerque, NM (US); Kumar Satya Harinadh Potluri, Albuquerque, NM (US); Amit Mizrahi, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 311 days.

(21) Appl. No.: 14/049,053

(22) Filed: Oct. 8, 2013

Related U.S. Application Data (60) Provisional application No. 61/711,626, filed on Oct. 9, 2012.

(51) Int. Cl.
| | |
|---|---|
| *G02B 6/12* | (2006.01) |
| *G02B 6/30* | (2006.01) |
| *G02B 6/26* | (2006.01) |
| *B23K 1/00* | (2006.01) |
| *G02B 6/14* | (2006.01) |
| *G02B 6/122* | (2006.01) |

(52) U.S. Cl.
CPC ............... *G02B 6/30* (2013.01); *B23K 1/0004* (2013.01); *G02B 6/1228* (2013.01); *G02B 6/14* (2013.01)

(58) Field of Classification Search
CPC ...... G02B 6/14; G02B 6/1223; G02B 6/1228; G02B 6/138; G02B 6/135; G02B 6/2551; G02B 6/30; G02B 6/43; G02B 6/4292; G02B 6/4214; G02B 6/3839; G02B 6/4204; G02B 6/4249; B23K 1/0004
USPC .................. 385/14, 27–28, 43, 49–52, 88–92, 385/123–132
See application file for complete search history.

(56) References Cited

U.S. PATENT DOCUMENTS

| | | | |
|---|---|---|---|
| 4,182,545 | A | 1/1980 | Greer |
| 6,690,857 | B2 | 2/2004 | Zhao et al. |
| 6,931,178 | B2 | 8/2005 | Saccomanno |
| 8,254,735 | B2 | 8/2012 | Tsai |
| 2005/0058416 | A1 | 3/2005 | Lee et al. |

(Continued)

OTHER PUBLICATIONS

Barkai, A., et al., "Efficient Mode Converter for Coupling between Fiber and Micrometer Size Silicon Waveguides." 2007 4th *IEEE International Conference on Group IV Photonics* (2007): pp. 49-51.
Khilo, A., et al., "Efficient Planar Fiber-to-Chip Coupler Based on Two-Stage Adiabatic Evolution." *Optics Express* 18.15 (2010): pp. 15790-15806.

(Continued)

*Primary Examiner* — Akm Enayet Ullah
*Assistant Examiner* — Michael Mooney
(74) *Attorney, Agent, or Firm* — Kilpatrick Townsend & Stockton LLP (57) ABSTRACT

An optical system includes a substrate and a first waveguide embedded on the substrate. The first waveguide has a first end. The optical system also includes an optical fiber optically coupled to the first waveguide and bounded to the substrate. The optical fiber has a first end with a flat portion forming a D-shaped cross section. The flat portion of the first end of the optical fiber is disposed adjacent to the first end of the first waveguide, thereby facilitating optical coupling between the first waveguide and the optical fiber.

18 Claims, 6 Drawing Sheets

(56) References Cited

U.S. PATENT DOCUMENTS

| | | |
|---|---|---|
| 2008/0266639 A1 | 10/2008 | Melloni et al. |
| 2009/0310140 A1 | 12/2009 | Smith et al. |
| 2010/0040327 A1 | 2/2010 | Deki et al. |
| 2013/0322813 A1* | 12/2013 | Grondin ................ B82Y 20/00 385/14 |

OTHER PUBLICATIONS

Park, H., et al., "A Fiber-to-Chip Coupler Based on Si/SiON Cascaded Tapers for Si Photonic Chips." *Optics Express* 21.24 (2013): pp. 29313-29319.

Non-Final Office Action mailed on Sep. 2, 2014 for U.S. Appl. No. 13/597,117, filed Aug. 28, 2012, all pages.

* cited by examiner

METHOD AND SYSTEM FOR OPTICALLY COUPLING A WAVEGUIDE AND A FIBER

CROSS-REFERENCES TO RELATED APPLICATIONS

This application claims the benefit under 35 U.S.C. §119 (e) of U.S. Provisional Patent Application No. 61/711,626, filed on Oct. 9, 2012, entitled "Method and System for Optically Coupling a Waveguide and a Fiber," which is incorporated by reference in its entirety.

BACKGROUND OF THE INVENTION

Advanced electronic functions such as photonic device bias control, modulation, amplification, data serialization and de-serialization, framing, routing, and other functions are typically deployed on silicon integrated circuits. A key reason for this is the presence of a global infrastructure for the design and fabrication of silicon integrated circuits that enables the production of devices having very advanced functions and performance at market-enabling costs. Therefore, there is a demand for integrated silicon photonics.

Thus, there is a need in the art for improved methods and systems for packaging silicon photonics chips.

SUMMARY OF THE INVENTION

According to an embodiment of the present invention, an optical system is provided. The optical system includes a substrate and a first waveguide embedded on the substrate. The first waveguide has a first end. The optical system also includes an optical fiber optically coupled to the first waveguide and bounded to the substrate. The optical fiber has a first end with a flat portion forming a D-shaped cross section. The flat portion of the first end of the optical fiber is disposed adjacent to the first end of the first waveguide, thereby facilitating optical coupling between the first waveguide and the optical fiber.

According to another embodiment of the present invention, a method for coupling an optical fiber to a waveguide is provided. The method includes providing a substrate comprising the waveguide disposed thereon and an alignment feature, the waveguide having a first end, and providing an optical fiber having a cylindrical portion and a first end with a flat portion forming a D-shaped cross section. The method also includes placing the optical fiber over the substrate such that the alignment feature on the substrate receives the cylindrical portion of the optical fiber and the flat portion of the first end of optical fiber overlies the first end of the waveguide, and bonding the cylindrical portion of the optical fiber to the substrate.

These and other embodiments of the invention along with many of its advantages and features are described in more detail in conjunction with the text below and attached figures.

DETAILED DESCRIPTION OF THE INVENTION

Embodiments of the present invention relate to integrated silicon photonics. More particularly, embodiments of the present invention relate to a method and system for coupling an optical fiber to a waveguide embedded on a semiconductor substrate. In a specific embodiment, an optical fiber with a D-shaped end is bonded to an optoelectronic chip, providing for optical coupling between the core of the optical fiber and the waveguide present on the optoelectronic chip. Embodiments of the present invention provide methods and systems that enable passive alignment of an optical fiber to an optoelectronic device, also referred to as an optoelectronic chip.

Figure 1:
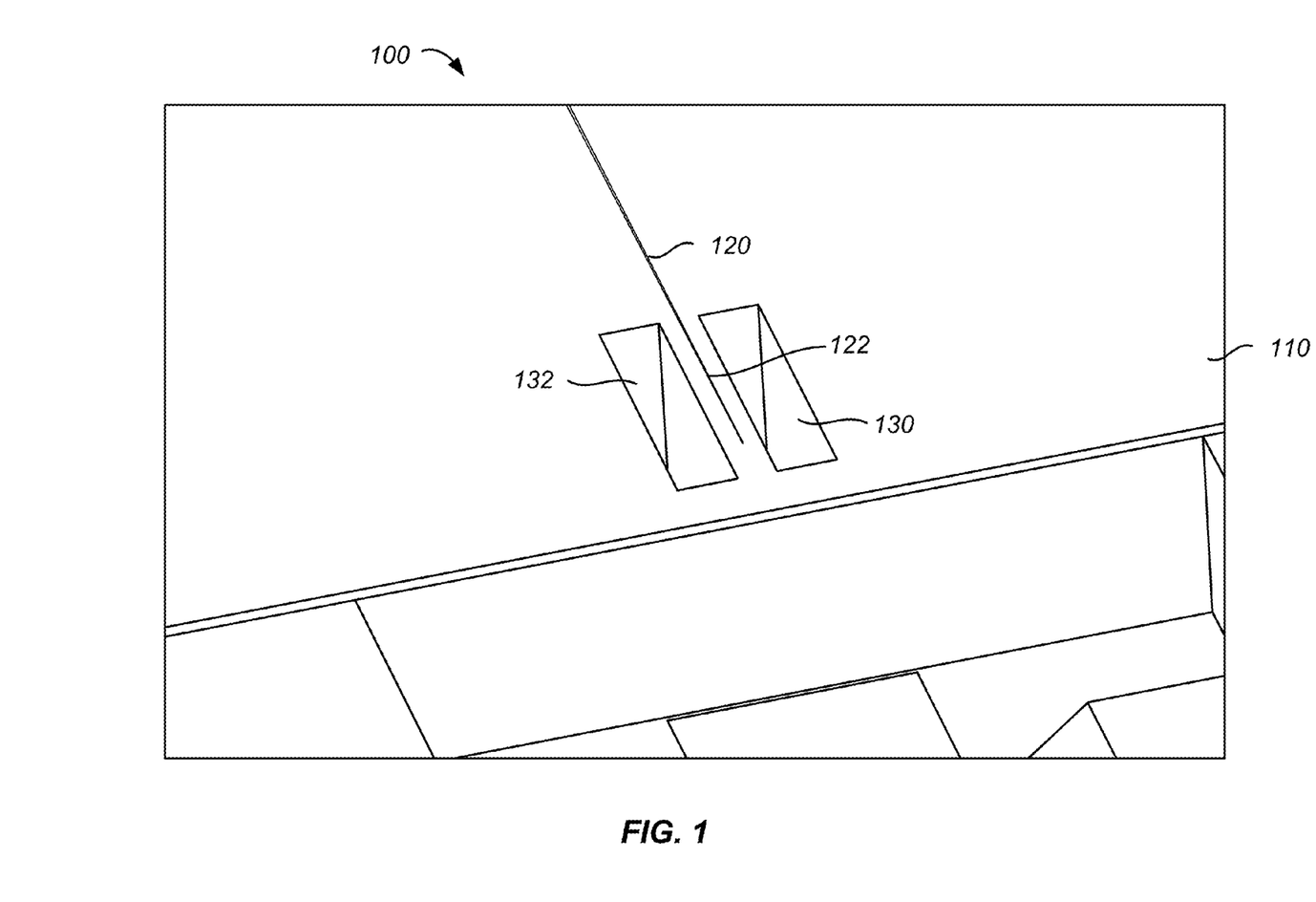
FIG. 1 is a schematic perspective view of an optical system including a substrate and a waveguide embedded on the substrate according to an embodiment of the invention.

FIG. 1 is a schematic perspective view of an optical system 100 according to an embodiment of the invention. The optical system 100 includes a substrate 110 and a waveguide 120 embedded on the substrate 110. In an embodiment, the substrate 110 comprises a silicon-oxide-on-silicon chip, and the waveguide 120 comprises a silicon waveguide. In other embodiments, the substrate 110 may comprise other semiconductor materials, such as gemanium, III-V compound semiconductor materials, II-VI compound semiconductor materials, and the like. The waveguide 120 may also comprise other semiconductor materials, such as gemanium, III-V compound semiconductor materials, II-VI compound semiconductor materials, and the like. One of ordinary skill in the art would recognize many variations, alternatives, and modifications.

The waveguide 120 has a first end 122. According to an embodiment, the first end 122 of the waveguide 120 is inversely tapered such that the cross section of the waveguide 120 decreases toward a tip of the first end 122 of the waveguide 120. The tapered portion of the waveguide 120 may have a length from about 50 μm to about 500 μm, or from about 200 μm to about 300 μm, according to various embodiments of the present invention. A mode profile of the optical field propagating in the waveguide 120 will expand toward the tip of the inversely tapered first end 122 of the waveguide 120. According to an embodiment, in order to prevent radiation from leaking into the substrate 110, portions of the substrate 110 on either side of the first end 122 of the waveguide 120 may be etched away to form two trenches 130 and 132 on the substrate 110, but this is not a requirement for the present invention.

Figure 2:
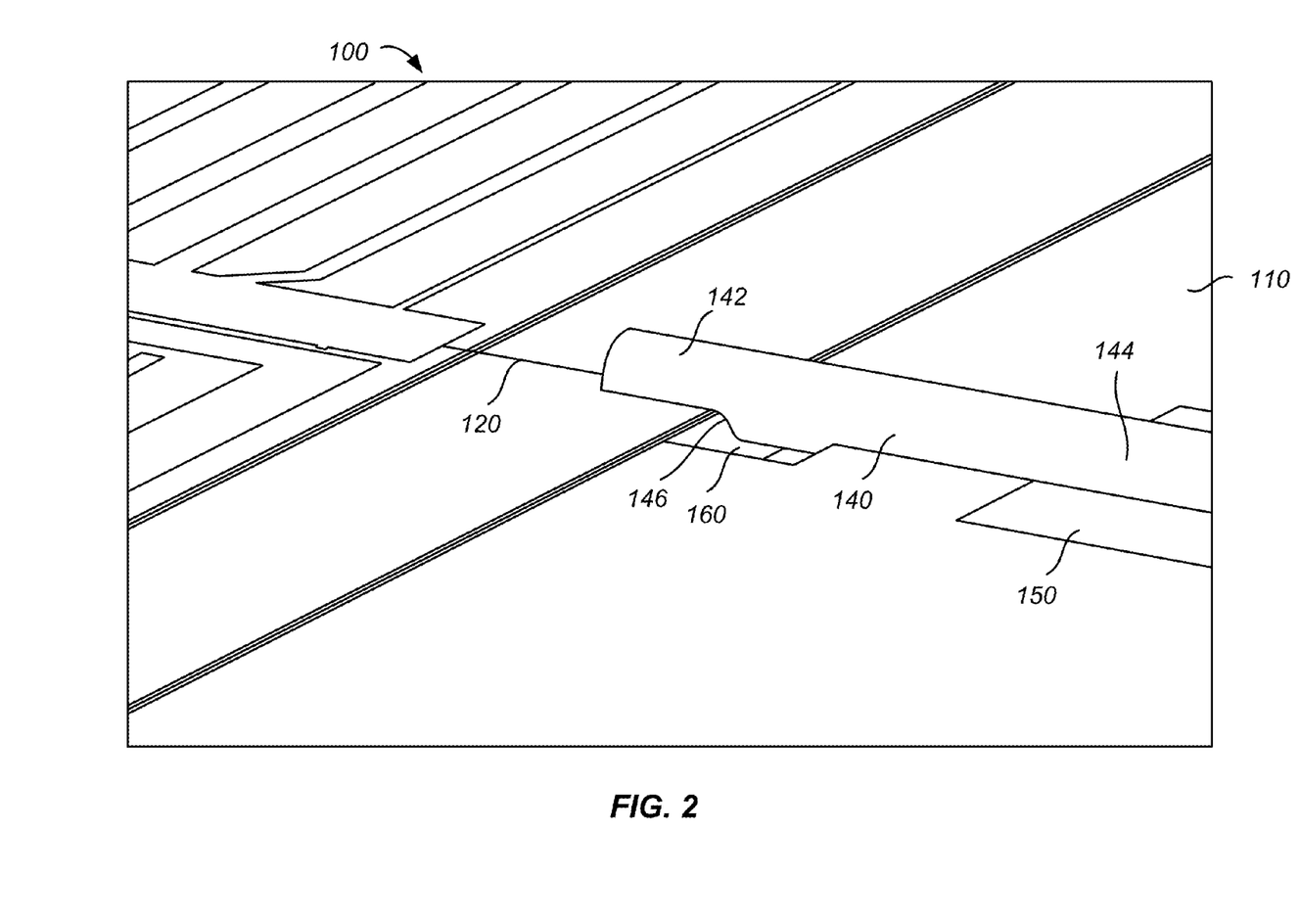
FIG. 2 is a schematic perspective view of an optical system including a substrate, a waveguide embedded on the substrate, and an optical fiber optically coupled to the waveguide according to an embodiment of the invention.

FIG. 2 is a schematic perspective view of the optical system 100 including an optical fiber 140 bonded to the substrate 110 and optically coupled to the waveguide 120, according to an embodiment of the present invention. The optical fiber 140 includes a body portion 144, a first end 142 with a flat portion, and a transition region 146 between the body portion 144 and the first end 142. In one embodiment, the optical fiber 140 comprises a single mode fiber, where the body portion 144 is cylindrical or has a circular cross section. In other embodiments, the optical fiber 140 may comprise a multimode fiber, a polarization maintaining fiber, and the like. One of ordinary skill in the art would recognize many variations, alternatives, and modifications.

Figure 3:
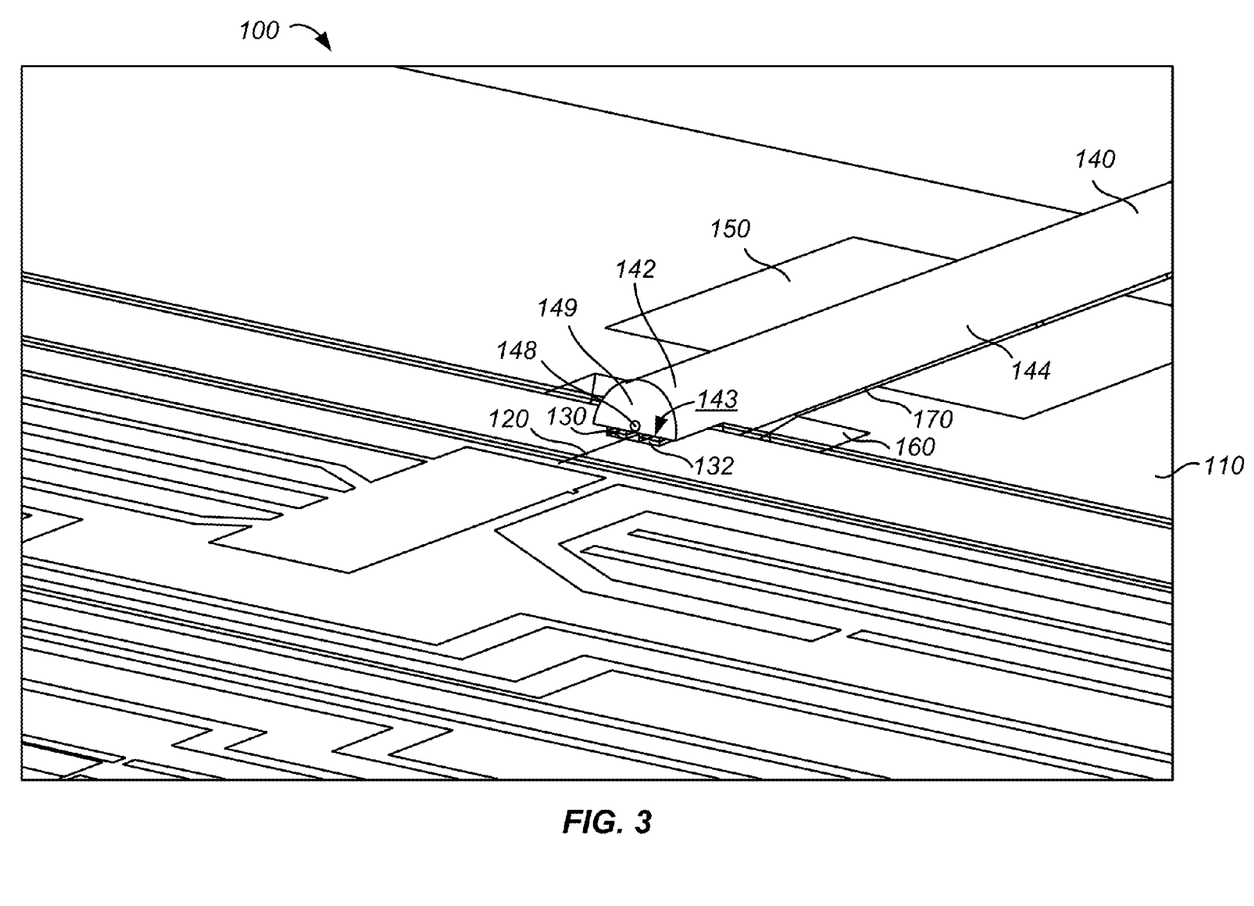
FIG. 3 is another schematic perspective view of the optical system shown in FIG. 2.

FIG. 3 is another schematic perspective view of the optical system 100 according to an embodiment of the present invention. The substrate 110 further includes an alignment feature 170, such as a groove. The alignment feature 170 is configured to receive the cylindrical portion 144 of the optical fiber 140. According to various embodiments, the alignment feature 170 may have a V-shaped cross section, an arc cross section, a square-well cross section, a stair step cross section, a combination of the foregoing, or the like. The alignment feature 170 provides for the alignment of the optical fiber 140 with respect to the waveguide 120 in a lateral direction as well as in the vertical direction. Also shown in FIGS. 2 and 3, another portion of the substrate 110 in the handle region may be etched away to form a cavity 160 to accommodate the cylindrical portion 144 of the optical fiber 140.

The first end 142 of the optical fiber 140 has a flat portion 143 forming a D-shaped cross section. The flat portion 143 may be formed by polishing the first end 142 of the optical fiber 140 while monitoring the distance of the flat portion 143 to the fiber core 148. The flat portion 143 of the first end 142 of the optical fiber 140 is positioned above the first end 122 of the waveguide 120. The flat portion 143 enables the fiber core 148 to be disposed in close proximity to the waveguide 120, thereby facilitating efficient evanescent coupling between the optical fiber 140 and the waveguide 120. In some embodiments, the flat portion 143 may have a length from about 1 mm to about 5 mm along the length of the optical fiber 140 according to some embodiments.

According to an embodiment, the optical system 100 further includes a metallic material 150 disposed in and adjacent to the alignment feature 170 of the substrate 110. After the optical fiber 140 has been properly positioned on the substrate 110, heating of the metallic material 150 can result in melting of the metallic material 150, thereby welding or soldering the optical fiber 140 to the substrate 110. According to various embodiments, the metallic material 150 may comprise In, InPd, InAu, Au, AuSn, Sn, Cu, Ag, Bi, Zn, Sb, a combination of the foregoing, and the like. According to an embodiment, heating the metallic material 150 is accomplished by passing a current through a resistor heater buried under or adjacent to the metallic material 150, but this is not a requirement for the present invention. In the case where the alignment feature 170 comprises a V-shaped groove, bonding of the optical fiber 140 to the substrate 110 occurs along two lines extending longitudinally along the length of the optical fiber 140.

Figure 4A:
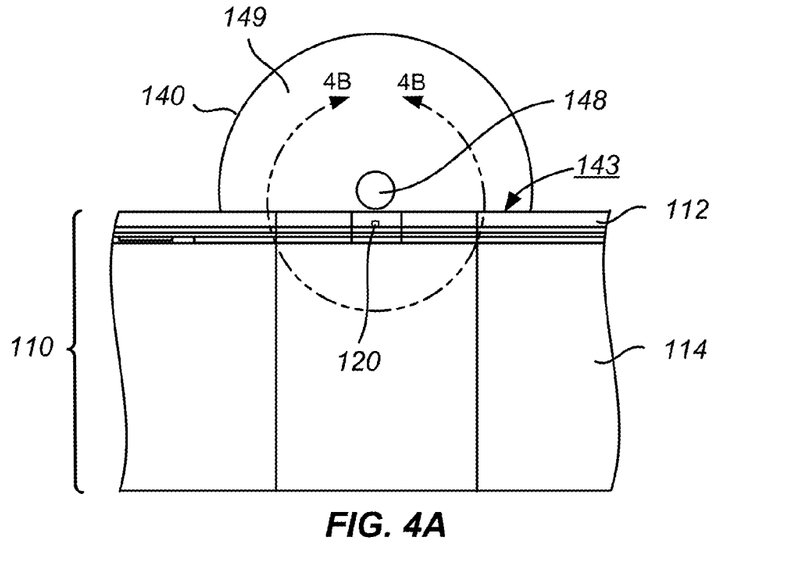
FIGS. 4A and 4B are schematic cross sectional views of the coupling region between the optical fiber and the waveguide according to an embodiment of the invention.
Figure 4B:
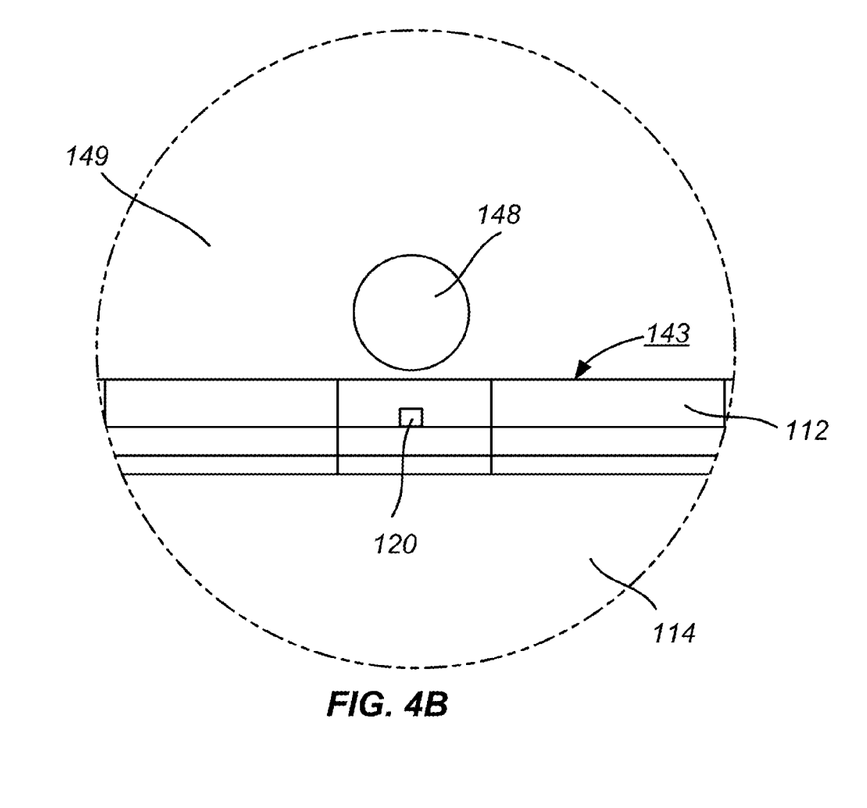

FIG. 4A is a schematic cross sectional view of the coupling region between the optical fiber 140 and the waveguide 120 according to an embodiment of the invention. FIG. 4B is an enlarged schematic cross sectional view of the region near the fiber core 148. As discussed above, the flat portion 143 of the first end 142 of the optical fiber 120 enables the fiber core 148 to be disposed in close proximity to the core of the waveguide 120. According to an embodiment, the flat portion 143 is formed only in the clad region 149 of the optical fiber 140, leaving the fiber core 148 intact, as shown in FIGS. 4A and 4B. According to other embodiments, the flat portion 143 may extend into the fiber core 148, i.e., a portion of the fiber core 148, as well is a portion of the clad 149, is removed in the polishing process. The proximity between the fiber core 148 and the core of the waveguide 120 enables efficient adiabatic transfer of the optical mode energy from the optical fiber 140 to the waveguide 120, and vice versa. According to various embodiments of the present invention, the distance from the center of the fiber core 148 to the top surface of the waveguide 120 is less than 10 µm, less than 5 µm, less than 4 µm, less than 3 µm, less than 2 µm, less than 1 µm, or the like.

According to an embodiment, the substrate 110 includes a silicon oxide layer 112 disposed on a bulk silicon layer 114. In one embodiment, as described above, in order to prevent radiation from leaking into the substrate, portions of the substrate 110 on either side of the first end 122 of the waveguide 120 are etched away to form two trenches 130 and 132 on the substrate 110, as shown in FIG. 1. The trenches 130 and 132 may be formed only in the silicon oxide layer 112, or may extended into the bulk silicon layer 114, and may also extend below the waveguide 120, according to various embodiments of the invention. As the optical mode propagates toward the tapered end 122 of the waveguide 120, the mode profile expands. The trenches 130 and 132 ensure that radiation leakage into the substrate is reduced or substantially prevented as the optical mode expands. In an embodiment, the silicon waveguide 120 is cladded with a low index material such as silicon oxide, and is suspended in air or other low index material, which provides confinement of the optical mode in the silicon oxide cladding.

Figure 5:
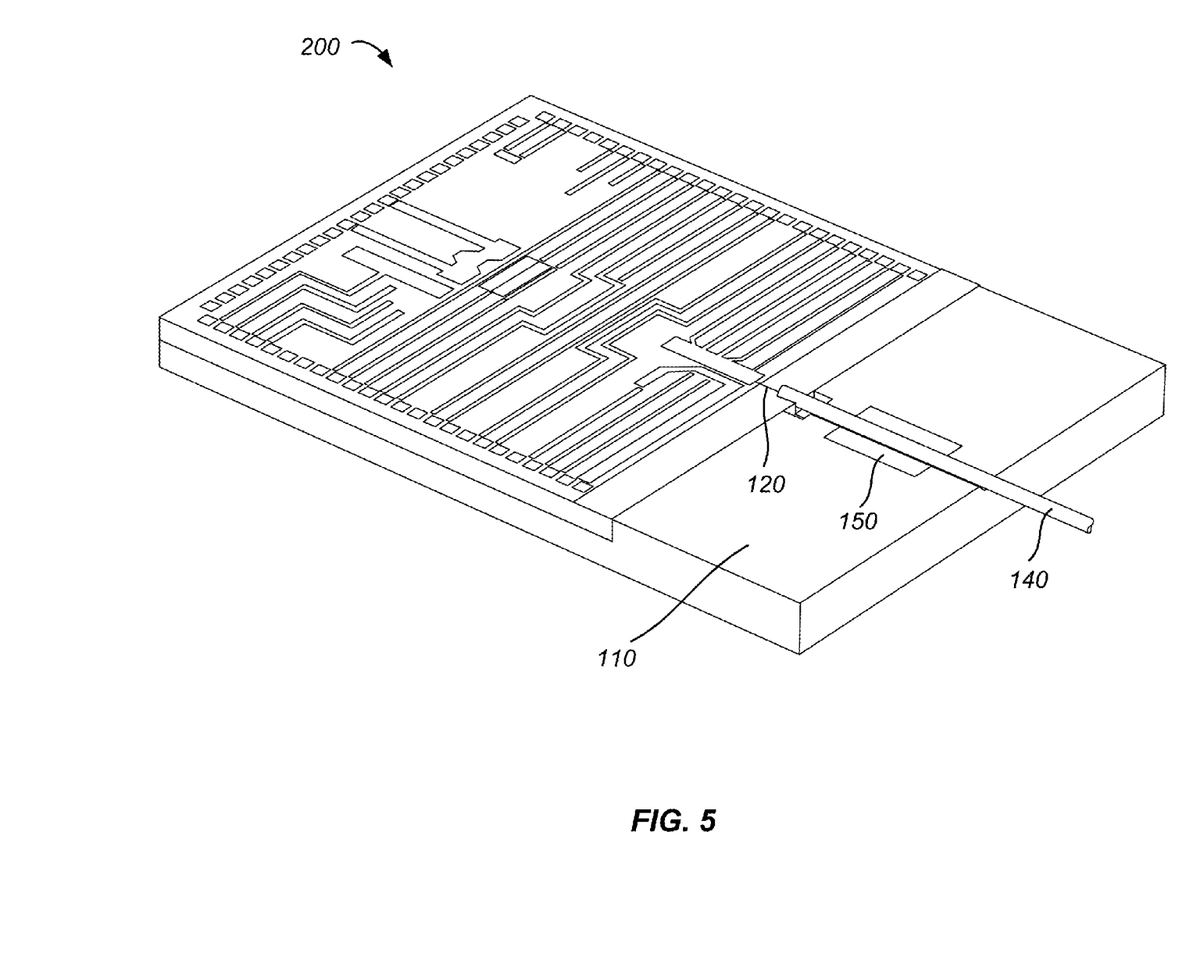
FIG. 5 is a schematic perspective view of a chip comprising a waveguide embedded thereon, and an optical fiber optically coupled to the waveguide according to an embodiment of the invention.

FIG. 5 is a schematic perspective view of a chip 200 according to an embodiment of the invention. The chip 200 comprises a substrate 110, a waveguide 120 embedded thereon, and an optical fiber 140 bonded to the chip 200 and optically coupled to the waveguide 120, as described above.

Figure 6:
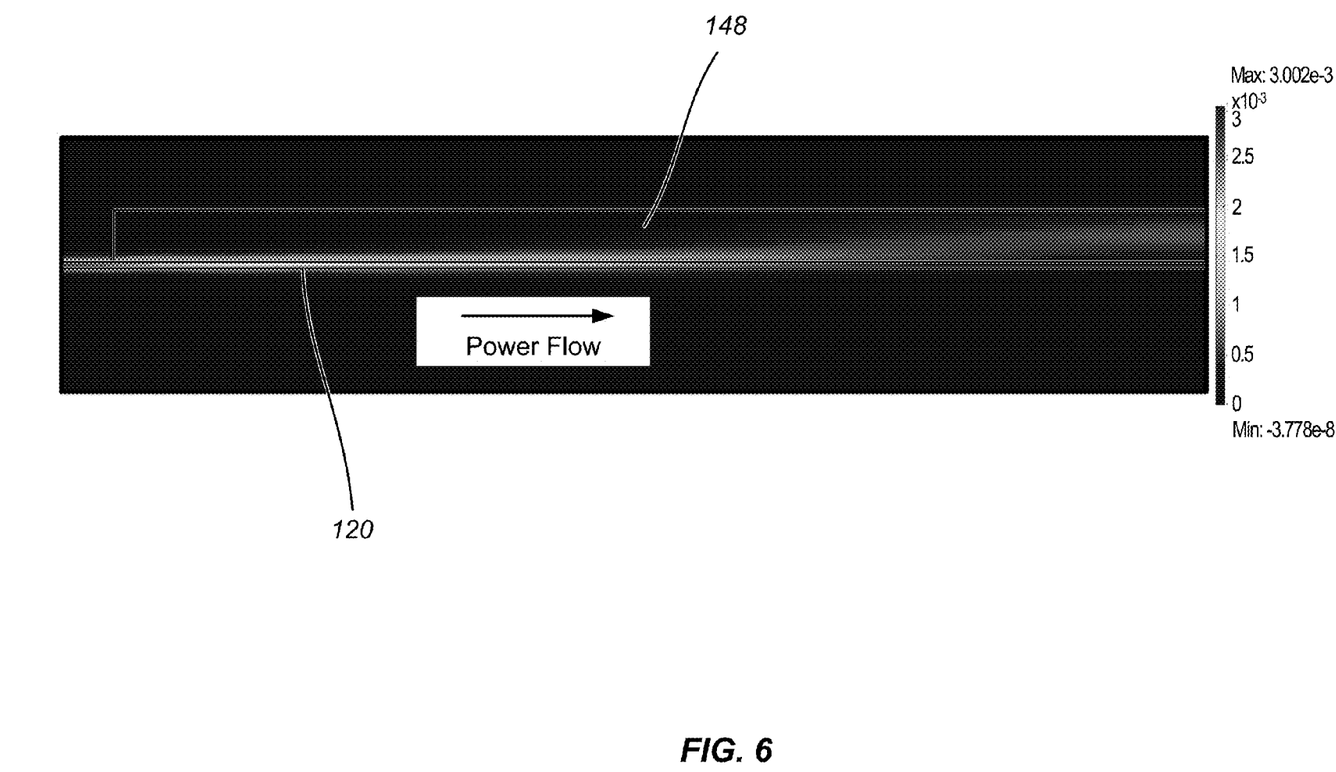
FIG. 6 illustrates simplified two-dimensional conceptual simulation results of the optical coupling between the waveguide and the optical fiber, showing the mode profile as the mode propagates in the direction of the power flow, according to an embodiment of the invention.

FIG. 6 illustrates simplified two-dimensional conceptual simulation results of the optical coupling between the waveguide 120 and the optical fiber 140, showing the mode profile as the mode propagates in the direction of the power flow, according to an embodiment of the invention. As can be seen, the mode profile expands in the direction of the power flow as a result of the inverse taper of the first end 122 of the waveguide 120, indicating an decreasing effective refractive index. The expanding mode profile facilitates evanescent coupling between the waveguide 120 and the optical fiber 140. The optical field is confined in the waveguide 120 on the left side of the figure and is adiabatically transferred into the core 148 of the optical fiber 140 as it propagates in the direction of the power flow. In some embodiments, a coupling efficiency greater than about 90% may be achieved. This method of coupling is relatively insensitive to the lateral and longitudinal displacement between the optical fiber 140 and the waveguide 120, thus making it attractive for passive alignment. The longitudinal displacement does not change the coupling length as long as the inversely tapered first end 122 of the waveguide 120 overlaps with the D-shaped first end 142 of the optical fiber 140. Since the D-shaped first end 142 of the optical fiber 140 can be longer than the inversely tapered first end 122 of the waveguide 120, a relatively low accuracy of the alignment between the optical fiber 140 and the waveguide 120 is needed.

According to some embodiments, more than one coupling stage is provided. For example, a first coupling stage may comprise a coupling between the silicon waveguide 120 and a silicon nitride waveguide; and a second coupling stage may comprise a coupling between the silicon nitride waveguide and the optical fiber 140. Silicon nitride has an index of refraction that is lower than that of the silicon waveguide 120 and higher than that of the fiber core 148. Thus, the multiple coupling stages would allow a more gradual expansion of the optical mode, thereby facilitating more efficient adiabatic transferring. Other materials in addition to silicon nitride that has an index of refraction between those of silicon and the fiber core may be utilized according to other embodiments. The multiple coupling stages may be implemented vertically in a direction orthogonal to the substrate surface, or longitudinally along the length of the waveguide, or a combination thereof. One of ordinary skill in the art would recognize many variations, alternatives, and modifications.

It is understood that although an optical fiber with a cylindrical or circular cross sectional body is described in this disclosure, the present invention is also applicable to optical fibers with other shapes of cross sections, such as elliptical, polygonal, and the like. One of ordinary skill in the art would recognize many variations, alternatives, and modifications.

It is further understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical system comprising:
   a substrate;
   a first waveguide embedded on the substrate, the first waveguide having a first end, wherein the first end of the first waveguide is inversely tapered such that a cross section of the first waveguide decreases toward a tip of the first end of the first waveguide; and
   an optical fiber optically coupled to the first waveguide and bounded to the substrate, the optical fiber having a first end with a flat portion forming a D-shaped cross section;
   wherein the flat portion of the first end of the optical fiber is disposed adjacent to the first end of the first waveguide, thereby facilitating optical coupling between the first waveguide and the optical fiber.

2. The optical system of claim 1 wherein the substrate comprises a silicon-oxide-on-silicon chip.

3. The optical system of claim 2 wherein the first waveguide comprises a silicon waveguide.

4. The optical system of claim 1 wherein the optical fiber comprises a single mode fiber.

5. The optical system of claim 1 wherein the flat portion of the first end of the optical fiber is formed in a clad region of the optical fiber.

6. The optical system of claim 1 wherein the flat portion of the first end of the optical fiber is formed in a clad region and a core region of the optical fiber.

7. The optical system of claim 1 wherein the flat portion of the first end of the optical fiber overlies the first end of the first waveguide in a vertical direction orthogonal to a plane of the substrate.

8. The optical system of claim 7 wherein the flat portion of the first end of the optical fiber is separated from a top surface of the first end of the first waveguide by less than 5 μm.

9. The optical system of claim 1 wherein the substrate comprises an alignment feature for receiving a cylindrical portion of the optical fiber.

10. The optical system of claim 9 wherein the alignment feature comprises a V-shaped groove.

11. The optical system of claim 9 further comprising a metallic material disposed between the alignment feature and the cylindrical portion of the optical fiber, wherein the metallic material bonds the optical fiber to the substrate.

12. The optical system of claim 1 wherein the substrate comprises two cavities on either side of the first end of the first waveguide.

13. The optical system of claim 3 further comprising a second waveguide optically interfaced between the first waveguide and the optical fiber.

14. The optical system of claim 13 wherein the second waveguide comprises a silicon nitride waveguide.

15. A method for coupling an optical fiber to a waveguide, the method comprising:
   providing a substrate comprising:
      the waveguide disposed thereon; the waveguide having a first end;
      an alignment feature; and
      a metallic material disposed in the alignment feature;
   providing an optical fiber having a cylindrical portion and a first end with a flat portion forming a D-shaped cross section;
   placing the optical fiber over the substrate such that the alignment feature on the substrate receives the cylindrical portion of the optical fiber and the flat portion of the first end of optical fiber overlies the first end of the waveguide; and
   bonding the cylindrical portion of the optical fiber to the substrate, wherein bonding the cylindrical portion of the optical fiber to the substrate comprises melting the metallic material, thereby welding the cylindrical portion of the optical fiber to the substrate.

16. The method of claim 15 wherein the substrate further comprises a resister heater embedded under the metallic material, and wherein melting the metallic material comprises conducting an electrical current through the resistor heater.

17. The method of claim 15 wherein the substrate comprises a silicon-oxide-on-silicon chip, and the waveguide comprises a silicon waveguide.

18. The method of claim 15 wherein the optical fiber comprises a single mode fiber.

\* \* \* \* \*